(12) United States Patent
Saarinen

(10) Patent No.: US 7,207,231 B2
(45) Date of Patent: Apr. 24, 2007

(54) RACK GEAR AND METHOD OF MAKING SAME

(75) Inventor: John Saarinen, Washington, MI (US)

(73) Assignee: TRW Automotive U.S. LLC, Livionia, MI (US)

( * ) Notice: Subject to any disclaimer, the term of this patent is extended or adjusted under 35 U.S.C. 154(b) by 617 days.

(21) Appl. No.: 10/485,795

(22) PCT Filed: Aug. 6, 2002

(86) PCT No.: PCT/US02/24900

§ 371 (c)(1),
(2), (4) Date: Feb. 4, 2004

(87) PCT Pub. No.: WO03/013938

PCT Pub. Date: Feb. 20, 2003

(65) Prior Publication Data

US 2004/0177501 A1 Sep. 16, 2004

Related U.S. Application Data

(60) Provisional application No. 60/310,912, filed on Aug. 8, 2001.

(51) Int. Cl.
*F16H 35/06* (2006.01)
(52) U.S. Cl. .................. 74/388 PS; 74/422; 29/893.34; 29/893.37
(58) Field of Classification Search ............ 74/388 PS, 74/422, 457; 29/893, 893.34, 893.37
See application file for complete search history.

(56) References Cited

U.S. PATENT DOCUMENTS

| 3,593,593 A | 7/1971 | Bradshaw |
| 3,792,624 A | 2/1974 | Pitner |
| 4,133,221 A * | 1/1979 | Clary ........................... 74/498 |
| 4,428,450 A | 1/1984 | Stenstrom et al. |
| 4,598,451 A * | 7/1986 | Ohki ......................... 29/893.3 |
| 4,646,554 A * | 3/1987 | Wallis et al. ................. 72/406 |
| 5,746,285 A | 5/1998 | Yonezawa |
| 5,890,394 A | 4/1999 | Anderson |
| 6,134,786 A | 10/2000 | Graupner et al. |
| 6,178,843 B1 | 1/2001 | Machida et al. |
| 6,442,992 B2 * | 9/2002 | Tsubouchi et al. ........ 72/370.21 |
| 6,502,473 B1 * | 1/2003 | Akiyama et al. .......... 74/89.17 |
| 6,779,271 B2 * | 8/2004 | Tsubouchi et al. ........ 29/893.34 |
| 6,898,853 B2 * | 5/2005 | Tsubouchi et al. ........ 29/893.34 |
| 2002/0020237 A1 * | 2/2002 | Tsubouchi et al. ........... 74/422 |
| 2004/0177501 A1 * | 9/2004 | Saarinen ...................... 29/875 |

FOREIGN PATENT DOCUMENTS

| WO | WO-03/013938 A2 | 2/2003 |
| WO | WO-03/013938 A3 | 2/2003 |

* cited by examiner

*Primary Examiner*—David M. Fenstermacher
(74) *Attorney, Agent, or Firm*—Tarolli, Sundheim, Covell & Tummino LLP

(57) ABSTRACT

A rack (20) for a rack and pinion steering system (10) includes a fully dense powder metal rack tooth section (50) joined, by sintering, to a hollow rack tube (30). The rack tooth section (50) is formed by pressing powder metal (70) into a die assembly (60) having internal rack tooth forms (68). The rack tube (30) and the pressed powder metal (70) are sintered to complete formation of the rack (20).

4 Claims, 4 Drawing Sheets

US 7,207,231 B2

RACK GEAR AND METHOD OF MAKING SAME

RELATED APPLICATIONS

This application claims the benefit of International Application No. PCT/US02/24900, filed Aug. 6, 2002, which claims priority from U.S. Saarinen Provisional Patent Application Ser. No. 60/310,912, filed Aug. 8, 2001.

BACKGROUND OF THE INVENTION

1. Technical Field

The present invention relates to a rack gear and, more specifically, to a rack gear for a rack and pinion steering system.

2. Description of Related Art

Both manual and power assisted vehicle steering systems have used rack and pinion gears in a known manner. The rack gear is typically formed on an elongate member that is connected at opposite ends with vehicle steering linkage, such as tie rods. It is desirable to minimize the weight of the elongate member in order to minimize the weight of the steering system, while still preserving the strength of the elongate member. U.S. Pat. No. 4,133,221 discloses a method of making a hollow rack gear by pressing together dies on opposite sides of a tubular member to form rack teeth on the tubular member.

SUMMARY OF THE INVENTION

The present invention is a method of forming a rack for a rack and pinion steering system. The method comprises the steps of:

providing a hollow tube having an axis, a first end portion, and a second end portion, the second end portion of the tube being adapted for connection with first vehicle steering linkage, such as a first tie rod, the first end portion being open;

closing a die assembly on the open first end portion of the tube to form a die cavity extending axially from the first end portion of the tube, the die assembly having internal rack tooth forms;

placing a quantity of powder metal in the die assembly and tube so that a first part of the powder metal extends into the open first end portion of the tube and a second part of the powder metal extends outward from the first end portion of the tube in the die cavity;

compressing the powder metal in the die cavity and in the first end portion of the tube to form a fully dense powder metal rack tooth section of the rack, the rack tooth section having a plurality of external rack teeth formed by the internal rack tooth forms of the die assembly; and sintering the powder metal rack tooth section of the rack.

The method may also comprise the additional step of locating a mandrel inside the powder metal in the die assembly to provide the rack tooth section with a hollow configuration. The sintering step includes securing the powder metal to the tube by the sintering process.

The present invention is also a rack for a rack and pinion steering system. The rack comprises a hollow tube having a first end portion, an axis, and a second end portion, the second end portion of the tube being adapted for connection with first vehicle steering linkage, such as a first tie rod. The rack also includes a rack tooth section secured to the first end portion of the tube, the rack tooth section of the rack comprising a fully dense powder metal member that is pressed and sintered. The rack tooth section has a first end portion and an opposite second end portion and a plurality of rack teeth formed by pressing and sintering located intermediate the first and second end portions of the rack tooth section. The first end portion of the rack tooth section has threads for engagement with second vehicle steering linkage, such as a second tie rod. The second end portion of the rack tooth section is secured to the first end portion of the tube by sintering.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DESCRIPTION OF THE INVENTION

Figure 1:
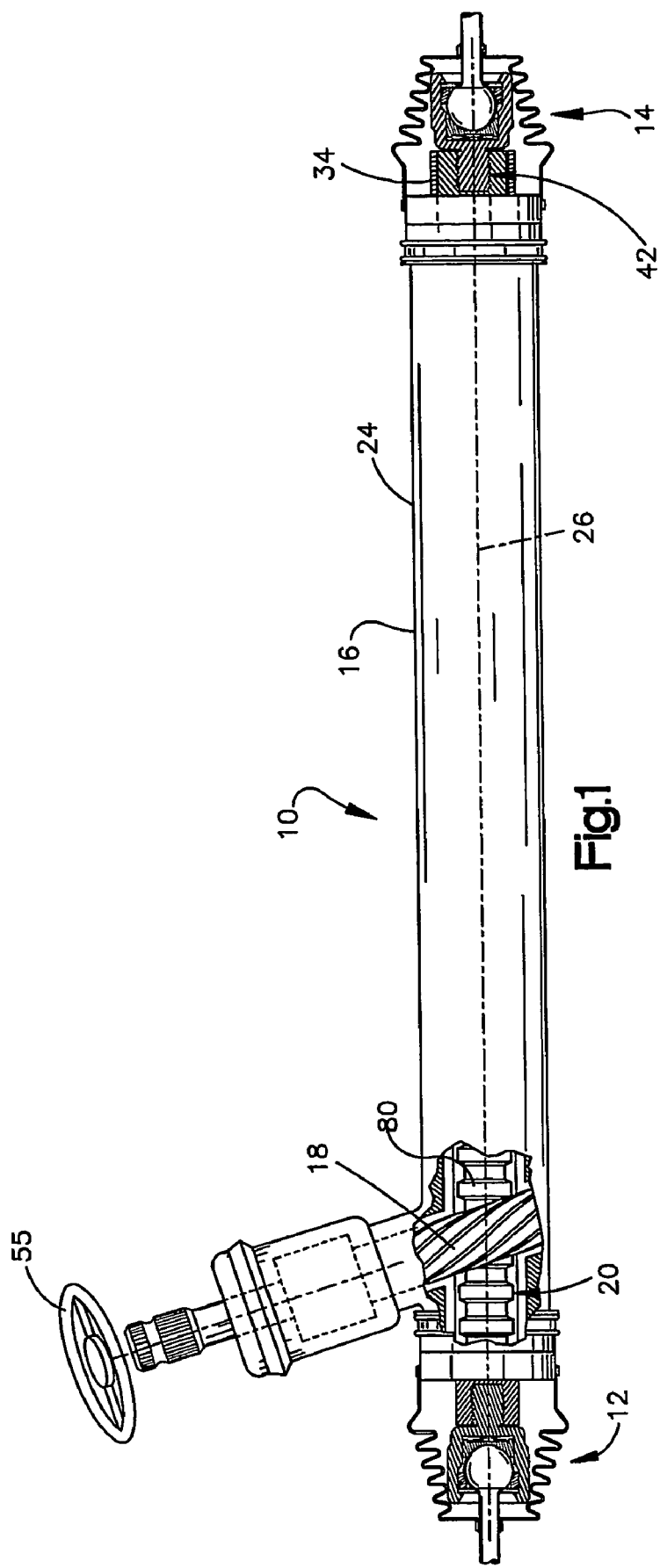
FIG. 1 is an illustration of a rack and pinion steering gear including a rack that is formed in accordance with a first embodiment of the present invention.
Figure 2:
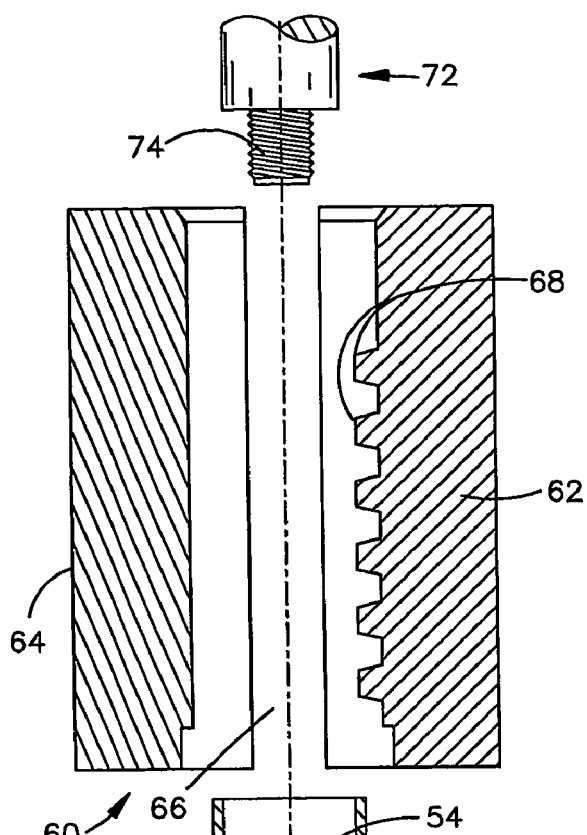
FIG. 2 is a sectional view of a rack tube that forms part of the rack of FIG. 1, shown in a condition prior to assembly into the rack, and associated with a mandrel and a die assembly and a ram.

The present invention relates to a rack gear and, more specifically, to a rack gear for a rack and pinion steering system. As representative of the present invention, FIG. 1 illustrates a rack and pinion steering gear 10 constructed in accordance with a first embodiment of the invention. The illustrated steering gear 10 is a hydraulic fluid power assisted steering gear, although the present invention is applicable also to manual or electric power assisted steering gear.

The steering gear 10 is connected with a pair of steerable vehicle wheels (not shown) in a known manner by steering linkage 12 at one end of the steering gear and by steering linkage 14 at the opposite end of the steering gear. The steering gear 10 includes a housing 16, a pinion 18, and a rack 20. The rack 20 extends longitudinally through a tubular portion 24 of the housing 16 along an axis 26.

The tubular housing portion 24 partially defines a fluid chamber (not shown). A piston (not shown) is fixed to the rack 20 at a location within the chamber. Upon rotation of the vehicle steering wheel (not shown), fluid under pressure is directed against the piston, causing the rack 20 to move within the housing 16 in a direction parallel to the axis 26. Axial movement of the rack 20 moves the steering linkage connected to the ends of the rack, thus turning the steerable wheels of the vehicle.

The rack 20 (FIGS. 2–6) includes a rack tube 30 and a rack tooth section 50. The rack tooth section 50 is formed by pressing and sintering powder metal to the rack tube 30, in a manner described below, thereby to form the rack 20.

The rack tube 30 itself, as initially formed, is a hollow cylindrical tube having first and second end portions 32 and 34 and a central portion 36. The rack tube 30 has parallel, cylindrical inner and outer side surfaces 38 and 40 that extend parallel to the axis 26. The first end portion 32 of the rack tube 30 is open.

The rack tooth section 50 is formed in the following manner. A solid mandrel 52 (FIG. 3) is placed in the rack tube 30 so that the first end portion 32 of the rack tube projects from the mandrel. The rack tube 30 is filled by the mandrel 52 except for the first end portion 32. (The rack tube may be disposed vertically at this time.) This first end portion 32 may have a length of one to three inches, for example, and has an open central chamber 54.

Figure 3:
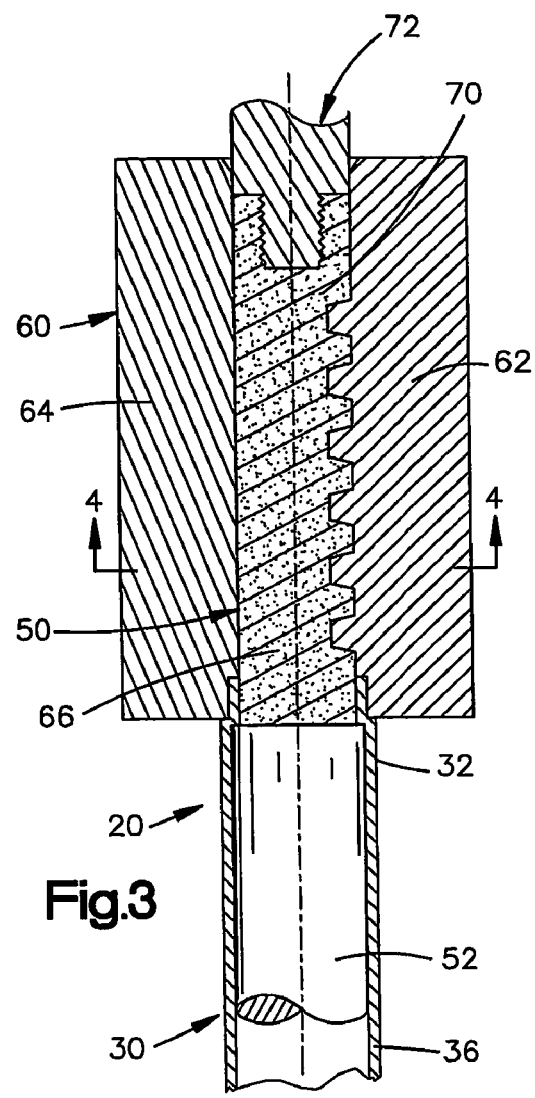
FIG. 3 is a view similar to FIG. 2 with the die assembly shown in a closed condition on the rack tube and the ram compressing metal powder into a die cavity and into the rack tube.
Figure 4:
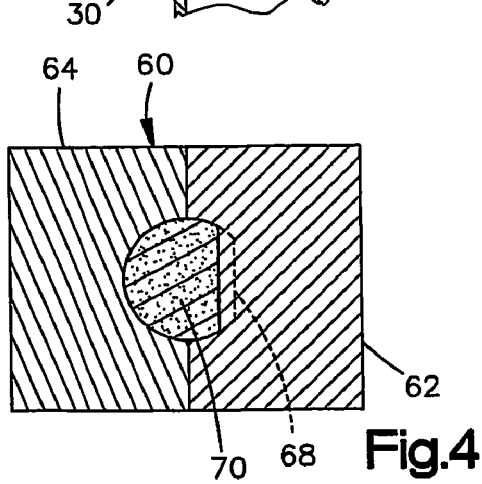
FIG. 4 is a radial sectional view taken along line 4—4 of FIG. 3.

Next, a die assembly 60 is associated with the rack tube 30 and mandrel 50. The die assembly 60, in the illustrated embodiment, includes a first die half 62 and a second die half 64. The first die half 62 and the second die half 64 are brought together in a mating relationship as shown in FIG. 3. In this condition, a die cavity 66 is formed between the first and second die halves 62 and 64. The die cavity 66 merges with the central chamber 54 of the first end portion 32 of the rack tube 30.

The first die half 62 has internal teeth 68 that are the mirror image of the rack teeth desired to be formed on the rack 20. The teeth 68 are shown only schematically in FIGS. 2 and 3 and may have a helical configuration or other configuration as desired. The second die half 64 may have a smooth, cylindrical inner surface.

Next, a quantity of metal powder 70 is placed in the die cavity 66. The metal powder 70 flows into the die cavity 66 and into the central chamber 54 of the first end portion 32 of the rack tube 30.

Then, a ram 72 is moved axially into the die cavity 66 from the end of the die assembly 60 opposite the rack tube 30. The ram 72 has an externally threaded end portion 74. The ram 72 compresses the metal powder 70 in the die cavity 66 and the metal powder in the first end portion 32 of the rack tube 30. The ram 72 presses the metal powder 70 into a coherent mass that can hold itself together and stay connected with the rack tube 30, until sintering. During this time, the mandrel 52 prevents the metal powder 70 from flowing out of the first end portion 32 of the rack tube 30 into the central portion 36 of the rack tube.

The die assembly 60 is then opened. The rack tube 30 and the cohered metal powder 70 are removed from association with the die assembly 60 and are placed in an oven or similar apparatus (not shown), and sintered. The sintering process forms the metal powder 70 into a strong, functional, fully dense powder metal rack tooth section 50 of the rack 20. The sintering process also joins the powder metal rack tooth section 50 to the rack tube 30. Specifically, the portion of the metal powder 70 that is in the first end portion 32 of the rack tube 30 is cohered with the material of the first end portion of the rack tube, so well that a joint between them can not be located afterward. This joining physically secures the powder metal rack tooth section 50 of the rack 20 to the rack tube 30, thus forming the completed rack 20.

The rack tooth section 50 of the rack 20 as thus formed has a plurality of rack teeth 80 formed by pressing of the metal powder 70 against the rack tooth 68 forms on the first die half 62. The rack teeth 80 are intermediate the first and second end portions 82 and 84 of the rack tooth section 50.

The threaded end portion 74 of the ram 70 provides the first end portion 82 of the rack tooth section 50 with internal threads 86 for engagement with first vehicle steering linkage, such as a first tie rod 12. The second end portion 84 of the rack tooth section 50 is secured to the first end portion 32 of the rack tube 30 by the sintering process.

In a second embodiment of the invention (FIG. 6), a second mandrel 90 is provided. The second mandrel 90 extends from the mandrel 52, through the center of the die cavity 66. When the metal powder 70 is pressed in the die cavity 66, it forms around the second mandrel 90. When the rack tooth section 50 is completed, it has an open center where the second mandrel 90 was located. This open center can allow fluid or air flow between the first and second end portions of the rack 20, if desired. This open center also means that the rack tooth section 50 is hollow, and thus lighter in weight.

Figure 3A:
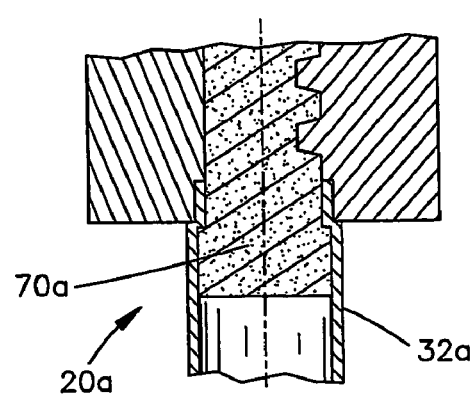

FIG. 3A shows a variation on the embodiment of FIG. 3. In FIG. 3A, the mandrel 52 is not moved all the way to the dies 62 and 64. AS a result, a portion of the powder metal 70 flows into the chamber 54 in the end portion of the tube 30, creating an additional mechanical bond.

Figure 5:
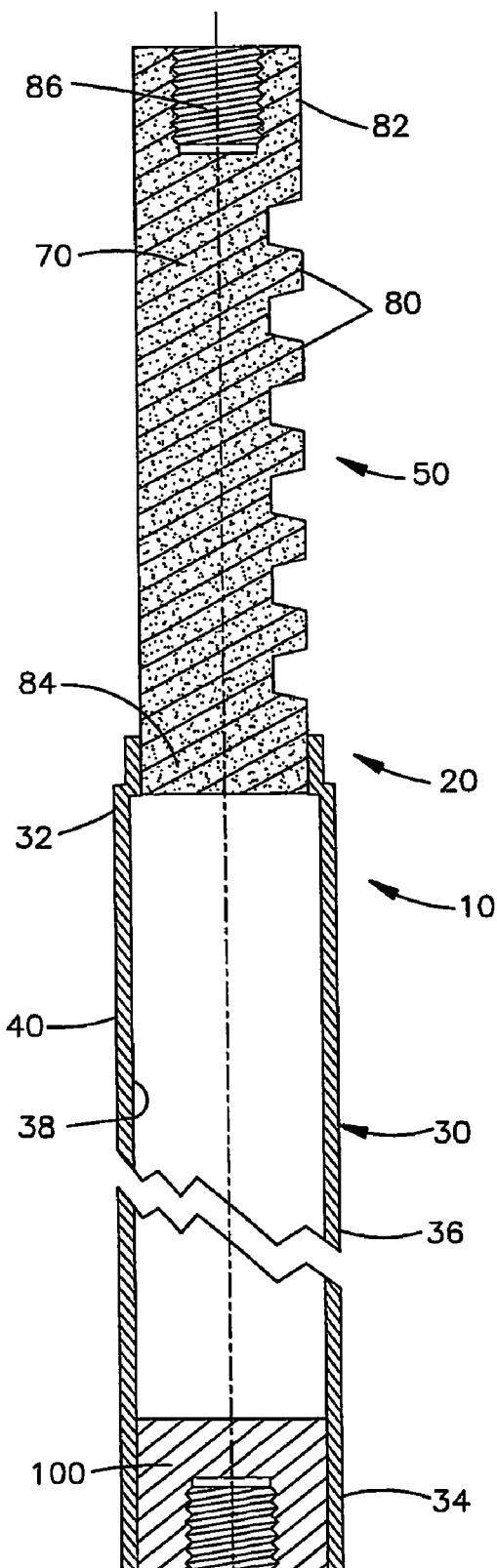
FIG. 5 is a longitudinal sectional view of the completed rack.
Figure 6:
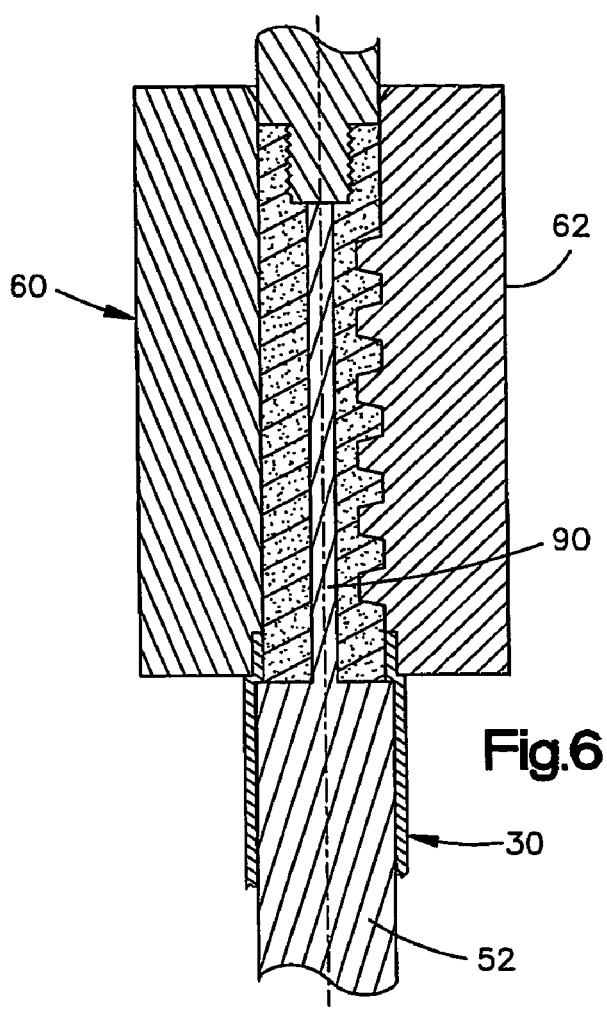
FIG. 6 is a view similar to FIG. 3 of a rack formed in accordance with a second embodiment of the invention.
Figure 5A:
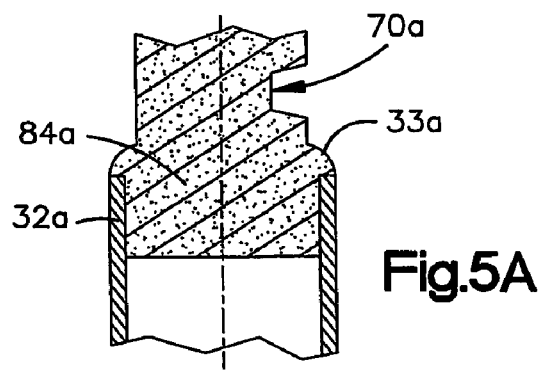

FIG. 5A shows a variation on the embodiment of FIG. 5. In FIG. 5A, the tube end 32a is not reduced in diameter. The powder metal 70a is sintered to create a blend surface 33a at the tube end 32a.

Figure 5B:
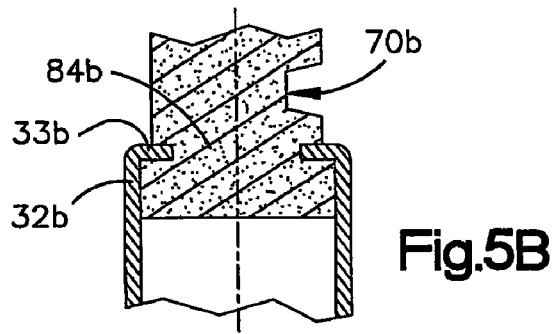

FIG. 5B shows another variation on the embodiment of FIG. 5. In FIG. 5B, the tube end 32b is rolled over to produce a lip 33b. The lip 33b provides additional mechanical retention of the powder metal 70b.

Figure 7:
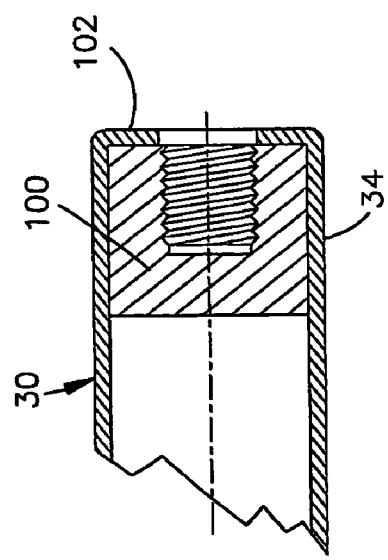
FIGS. 7–11 show variations on the tube end design.

The second end portion 34 of the rack tube 30 is provided with an internal thread 42 for connection with the first steering linkage 14. The internally threaded second end portion 34 of the rack tube 30 can be formed in a number of different ways. As shown in FIG. 5, a compressed metal insert 100 is pressed into the end portion 34 of the tube 30, prior to the sintering process. When the tube 30 is sintered with the rack tooth portion 50, the sintering creates a mechanical bond of great strength between the tube and the insert 100. As shown in FIG. 7, the end portion 102 of the tube 30 may be rolled over prior to sintering, to aid in retention of the insert 100 in the tube. This rolling over process also allows this insert to be a pressed-in machined steel insert.

Figure 8:
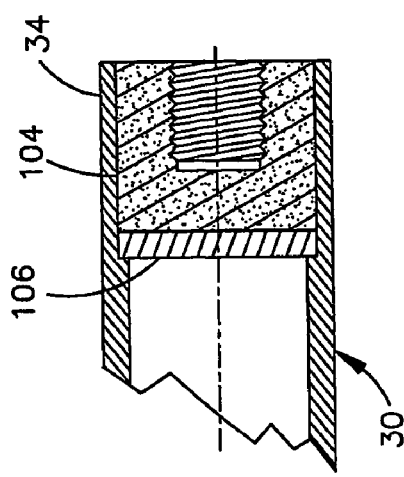

As shown in FIG. 8, the inner diameter of the tube end portion 34 can be opened up to create a pocket 104. A flat round plate 106 is inserted and powder metal 70 is compressed into the pocket 104. The device is then sintered for strength and to create a bond between the powder metal 70 and the tube 30.

Figure 9:
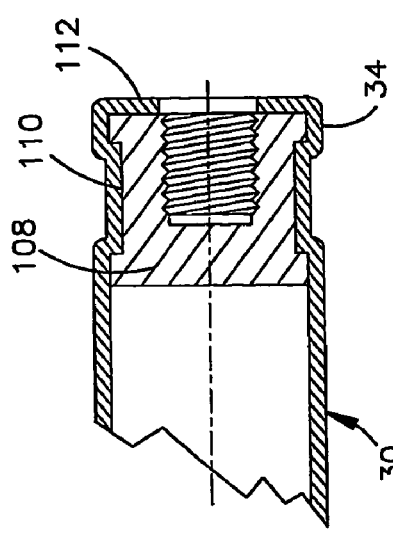

As shown in FIG. 9, an insert 108 can be made from powder metal or screw machined from steel. The insert 108 has a groove 110. The material of the rack tube 30 is rolled into the groove 110 to secure the pieces together. If the insert 108 is powder metal, the assembled piece can be sintered after rolling, or the insert can be sintered separately before pressing into the tube 30. The end portion 34 of the tube 30 may be rolled, as shown at 112, to aid in retention of the insert 108 in the tube.

Figure 10:
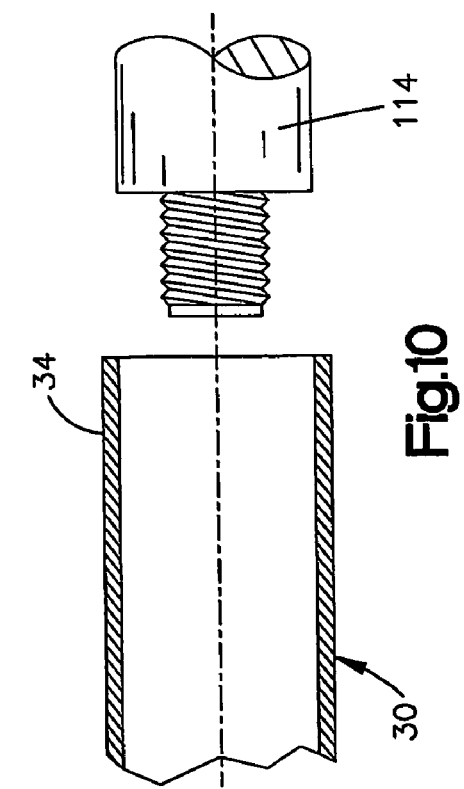
Figure 11:
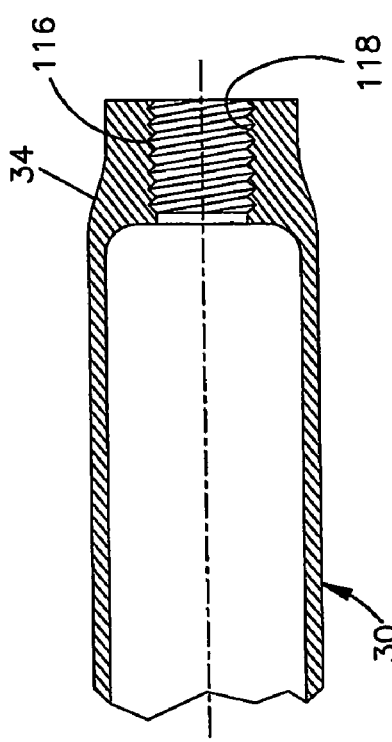

As shown in FIGS. 10 and 11, the end 34 of the tube 30 can be rolled down onto a thread forming die 114. Alternatively, the end 34 of the tube 30 can be rolled down to a predetermined ID 116 then threads 118 can be cut or rolled.

From the above description of the invention, those skilled in the art will perceive improvements, changes and modifications in the invention. Such improvements, changes and modifications within the skill of the art are intended to be covered by the appended claims.

Having described the invention, I claim:

1. A method of forming a rack for a rack and pinion steering system, said method comprising the steps of:

providing a hollow tube having an axis, a first end portion, and a second end portion, the second end portion of the tube being adapted for connection with first vehicle steering linkage, such as a first tie rod, the first end portion being open;

closing a die assembly on the open first end portion of the tube to form a die cavity extending axially from the first end portion of the tube, the die assembly having internal rack tooth forms;

placing a quantity of powder metal in the die assembly and tube so that a first part of the powder metal extends into the open first end portion of the tube and a second part of the powder metal extends outward from the first end portion of the tube in the die cavity;

compressing the powder metal in the die cavity and in the first end portion of the tube to form a fully dense powder metal rack tooth section of the rack, the rack tooth section having a plurality of external rack teeth formed by the internal rack tooth forms of the die assembly; and sintering the powder metal rack tooth section of the rack.

2. A method as set forth in claim 1 comprising the additional step of locating a mandrel inside the powder metal in the die assembly to provide the rack tooth section with a hollow configuration.

3. A method as set forth in claim 1 wherein said sintering step includes securing the powder metal to the tube by the sintering process.

4. A rack for a rack and pinion steering system, said rack comprising:

a hollow tube having a first end portion, an axis, and a second end portion, said second end portion of said tube being adapted for connection with first vehicle steering linkage, such as a first tie rod; and a rack tooth section of said rack secured to said first end portion of said tube, said rack tooth section of said rack comprising a fully dense powder metal member that is pressed and sintered;

said rack tooth section having a first end portion and an opposite second end portion and a plurality of rack teeth formed by pressing and sintering located intermediate said first and second end portions of said rack tooth section;

said first end portion of said rack tooth section having threads for engagement with second vehicle steering linkage, such as a second tie rod, said second end portion of said rack tooth section being secured to said first end portion of said tube by sintering.

* * * * *